United States Patent [19]

Cheresnowsky et al.

[11] Patent Number: 4,643,884

[45] Date of Patent: Feb. 17, 1987

[54] PURIFICATION OF MOLYBDENUM TRIOXIDE

[75] Inventors: Michael J. Cheresnowsky, Towanda; Timothy A. Brunelli, Wyalusing; Robin W. Munn, Sayre, all of Pa.

[73] Assignee: GTE Products Corporaton, Stamford, Conn.

[21] Appl. No.: 846,170

[22] Filed: Mar. 31, 1986

Related U.S. Application Data

[63] Continuation of Ser. No. 777,898, Sep. 19, 1985, which is a continuation-in-part of Ser. No. 699,699, Feb. 8, 1985.

[51] Int. Cl.$^4$ ............................................. C01G 39/02
[52] U.S. Cl. ........................................ 423/53; 423/61; 423/593
[58] Field of Search ........................... 423/53, 61, 593

[56] References Cited

U.S. PATENT DOCUMENTS

| | | | |
|---|---|---|---|
| 3,694,147 | 9/1972 | Drobnick et al. | 423/53 |
| 3,829,550 | 8/1974 | Ronzio et al. | 423/56 |
| 3,848,049 | 11/1974 | Ronzio et al. | 423/56 |
| 3,860,419 | 1/1975 | Welier et al. | 423/53 |
| 3,957,946 | 5/1976 | Ronzio et al. | 423/54 |
| 4,525,331 | 6/1985 | Chersnowsky et al. | 423/61 |

Primary Examiner—H. T. Carter
Attorney, Agent, or Firm—Donald R. Castle; L. Rita Quatrini

[57] ABSTRACT

A process is disclosed for removing potassium from relatively impure molybdenum trioxide. The process involves contacting the impure molybdenum trioxide containing greater than about 600 weight parts potassium per million with a first acid leach which consists essentially of nitric acid and ammonium nitrate at a temperature of at least about 50° C. for a sufficient time and at above a 2 molar concentration of said nitric acid and an ammonium nitrate concentration of from about 1.5 to about 2 molar in said first acid leach to solubilize the major portion of the potassium and form a once leached molybdenum trioxide containing the remaining portion of the potassium which is separated from the resulting potassium containing acid leach and contacted with a second leach solution substantially similar to the first acid leach followed by separating the resulting twice leached molybdenum trioxide from the resulting potassium containing second leach. The twice leached molybdenum trioxide is contacted with sufficient water to remove any residual impurities followed by removal of the resulting wash water.

8 Claims, No Drawings

PURIFICATION OF MOLYBDENUM TRIOXIDE

This is a continuation of Application Ser. No. 777,898, filed Sept. 19, 1985 which is a continuation-in-part of Application Ser. No. 699,699, filed Feb. 8, 1985.

FIELD OF THE INVENTION

This invention relates to a process for removing potassium from relatively impure molybdenum trioxide. More particularly, it relates to a process for removing potassium from relatively impure molybdenum trioxide by acid leaching the molybdenum trioxide.

BACKGROUND OF THE INVENTION

Molybdenum compounds of high purity are required for various applications such as in catalysts, etc.

Heretofore, there have been a number of processes for upgrading relatively impure molybdenum compounds as molybdenum oxide.

U.S. Pat. No. 3,957,946 discloses a process for purifying moybdenum which involves subjecting impure concentrates of molybdenum oxide to oxidative roasting, followed by ammoniacal leaching of the molybdic oxide to produce ammonium molybdate which is further purified by passage through a chelating cation exchange resin.

U.S. Pat. Nos. 3,848,049 and 3,829,550 disclose purification processes for molybdenum which involve leaching of molybdenum oxide with dilute nitric acid.

U.S. Pat. No. 3,694,147 discloses a process for purifying molybdenum oxide of impurities such as lead, copper, iron, zinc, and some alkaline earths by leaching with an aqueous solution of a hydrohalic acid and an ammonium salt of the halide. This patent does not teach removal of potassium. It is specifically stated in this patent that nitric acid-ammonium nitrate are unsatisfactory in the process of the invention.

U.S. Pat. No. 3,860,419 relates to a process for recovering molybdenum from molybdenum concentrates by digesting the concentrate in an aqueous nitric acid solution containing ammonium nitrate, separating the solid phase from the liquid phase, and treating the solid phase with ammonium hydroxide to produce ammonium molybdate. In column 3, lines 9 to 16, the digestion solution is disclosed as containing substantially 1.0 to 4.0 moles per liter of free nitric acid and 0.5 to 2.0 moles per liter of ammonium nitrate. The weight ratio of solution to concentrate is substantially 1 to 1 to 3 to 1. In column 3, lines 17 to 26, the preferred range of the solution is described as containing from about 2.0 to 2.3 moles per liter nitric acid and 1.5 to 2 moles per liter of ammonium nitrate. Weber teaches the use of nitric acid-ammonium nitrate for removal of "alkali metals". There is no mention in Weber of removal of potassium.

In the above processes, some impurities remain to contaminate the product.

Potassium is a particularly difficult impurity to remove. When U.S. Pat. No. 3,860,419 is followed for purifying molybdenum, potassium is not sufficiently reduced for use as high purity material.

Therefore, a process for purifying molybdenum in which the potassium level is further reduced would be highly desirable and an advancement in the art.

SUMMARY OF THE INVENTION

In accordance with one aspect of this invention, there is provided a process for removing potassium from relatively impure molybdenum trioxide. The process involves contacting the impure molybdenum trioxide containing greater than about 600 parts potassium per million with a first acid leach which consists essentially of nitric acid and ammonium nitrate at a temperature of at least about 50° C. for a sufficient time and at above a 2 molar concentration of said nitric acid and an ammonium nitrate concentration of from about 1.5 to about 2 molar in said first acid leach to solubilize the major portion of the potassium and form a once leached molybdenum trioxide containing the remaining portion of the potassium which is separated from the resulting potassium containing acid leach and contacted with a second leach solution which is substantially similar to the first acid leach followed by separating the resulting twice leached molybdenum trioxide from the resulting potassium containing second leach. The twice leached molybdenum trioxide is contacted with sufficient water to remove any residual impurities followed by removal of the resulting wash water.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The starting material to be purified is molybdenum trioxide. Generally the potassium level is from about 600 to about 4000 weight parts per million and most typically about 1000 to about 2000 weight parts per million.

The relatively impure molybdenum trioxide is first contacted preferably with vigorous agitation with a first acid leach solution which is made up essentially of nitric acid which is at a concentration of above about 2 molar and ammonium nitrate at a concentration of from about 1.5 molar to about 2 molar, the purpose of which is to dissolve or leach out the major portion of the potassium into the first acid leach.

In accordance with the preferred embodiment, the nitric acid concentration is above about 2.0 molar with from about 2.3 molar to about 4.2 molar being preferred and about 2.3 molar being especially preferred.

The ammonium nitrate concentration is preferably from about 1.5 to about 2.0 molar with about 1.75 molar being especially preferred. Therefore, the preferred first acid leach concentration is about 2.3 molar nitric acid and about 1.75 molar ammonium nitrate. The weight ratio of the first acid leach to the impure molybdenum trioxide is generally above about 2 to 1 with from about 2.4 to 1 to about 4.8 to 1 being preferred and about 2.4 to 1 being especially preferred. In general, the higher this weight ratio, the greater the reduction of potassium in the molybdenum trioxide. However, with the higher ratios, there is greater liklihood of loss of molybdenum to the acid leach. At the above preferred range of from about 2.4 to 1 to about 4.8 to 1 the potassium is reduced to levels which render the molybdenum suitable for use as high purity material and at the same the loss of molybdenum to the acid leach is at a minimum.

The impure molybdenum trioxide is contacted with the first acid leach preferably at elevated temperatures to facilitate the potassium removal. Temperatures are generally from about 50° C. to about 100° C. with from about 75° C. to about 85° C. being preferred. Heating times are generally from about 1 hour to about 3 hours.

The resulting once leached molybdenum trioxide is then separated from the resulting potassium containing frist acid leach by any standard technique such as by filtration or decantation.

The once leached molybdenum trioxide is then contacted with a second acid leach which is substantially similar to the first acid leach in essentially the same manner as the first leaching. The resulting twice leached molybdenum trioxide is essentially free of potassium. It is then separated from the resulting potassium containing second acid leach by any standard technique such as filtration or decantation.

The twice leached molybdenum trioxide is then washed with sufficient water to remove any residual impurities, in particular impurities resulting from contamination by the first and second acid leaches. The washing step is carried out preferably by slurrying the twice leached molybdenum trioxide with water, preferably deionized water at about 2 parts of water per part of molybdenum trioxide and stirring vigorously for from about 15 minutes to about 45 minutes. The resulting water slurried molybdenum trioxide is then separated from the resulting wash water by any standard technique such as filtration or decantation.

If separation is by decantation, there is still a liklihood of some contamination by the first and second acid leaches, and therefore, the slurried molybdenum trioxide is reslurried at least one more time with water according to the above procedure to obtain a once washed molybdenum trioxide.

If separation is by filtration, no further washing is needed.

As an alternate embodiment of the invention, the once leached molybdenum trioxide, prior to being contacted with the seocnd acid leach, is water washed according to the same procedure described previously for the wash of the twice leach molybdenum trioxide.

Of course, if this alternate embodiment is carried out, the twice leached molybdenum trioxide is still water washed according to the procedure described previously to ensure freedom from contamination by the acid leaches.

The molybdenum trioxide resulting from the above process contains no greater than about 55 weight parts of potassium per million.

To more fully illustrate this invention, the following non-limiting example is presented. All parts, portions, and percentages are on a weight basis unless otherwise stated.

EXAMPLE

About 125 parts of impure molybdenum trioxide containing about 3700 parts of potassium per million is stirred vigorously in about 2.4 parts of acid leach at about 75° C. to about 85° C. for about 2 hours. The resulting slurry is allowed to settle and cool, after which the acid leach is decanted from the leached molybdenum trioxide. The resulting leached molybdenum trioxide is then washed by slurrying it vigorously with about 250 parts of water for about 30 minutes. The resulting wash water is then decanted after the molybdenum trioxide and water are allowed to settle. The once slurried molybdenum trioxide is then reslurried in water and separated from the wash water according to the same procedure as described above. The resulting washed molybdenum trioxide is then analyzed for potassium. The resulting washed molybdenum trioxide is then contacted with a second acid leach solution, and washed according to the above described procedure. A sample of the resulting twice leached twice washed molybdenum trioxide is analyzed for potassium. The results are given below:

|  | Acid Leach Composition | |
|---|---|---|
|  | 2.3 M $HNO_3$-<br>1.75 M $NH_4NO_3$ | 4.2 M $HNO_3$-<br>1.75 M $NH_4NO_3$ |
| Oxide before leach | 3700 ppm K | 3700 ppm k |
| Oxide after first leach | 260 ppm K | 240 ppm K |
| Oxide after second leach | 53 ppm K | 48 ppm K |

Results show that the potassium levels are significantly lowered by the second leach.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for removing potassium from relatively impure molybdenum trioxide, said process comprising:
   (a) contacting said impure molybdenum trioxide containing greater than about 600 weight parts potassium per million with a first acid leach which consists essentially of nitric acid and ammonium nitrate at a temperature of at least about 50° C. for a sufficient time and at above a 2 molar concentration of said nitric acid and an ammonium nitrate concentration of from about 1.5 to about 2 molar in said first acid leach to solubilize the major portion of the potassium and form a once leached molybdenum trioxide containing the remaining portion of the potassium;
   (b) separating said once leached molybdenum trioxide from the resulting potassium containing first acid leach;
   (c) contacting the once leached molybdenum trioxide with a second acid leach solution substantially similar to said first acid leach solution at a temperature of at least about 50° C. for a sufficient time to solubilize essentially all of the remaining portion of the potassium and form a twice leached molybdenum trioxide;
   (d) separating said twice leached molybdenum trioxide from the resulting potassium containing second acid leach;
   (e) contacting said twice leached molybdenum trioxide with sufficient water to remove any residual impurities; and
   (f) separating the resulting twice leached washed molybdenum trioxide from the resulting wash water.

2. A process according to claim 1 comprising the alternate steps of, prior to contacting said once leached molybdenum trioxide with said second acid leach:
   (a) washing said once leached molybdenum trioxide with sufficient water to remove any residual impurities; and
   (b) separating the resulting first leached washed molybdenum trioxide from the resulting wash water.

3. A process according to claim 1 wherein the temperature is from about 50° C. to about 100° C.

4. A process according to claim 1 wherein the time is from about 1 to about 3 hours.

5. A process according to claim 1 wherein the twice leached molybdenum trioxide contains no greater than about 55 weight parts of potassium per million.

6. A process according to claim 2 wherein the temperature is from about 50° C. to about 100° C.

7. A process according to claim 2 wherein the time is from about 1 to about 3 hours.

8. A process according to claim 2 wherein the twice leached molybdenum trioxide contains no greater than about 55 weight parts of potassium per million.

* * * * *